United States Patent [19]

Ahne et al.

[11] Patent Number: 4,619,500

[45] Date of Patent: Oct. 28, 1986

[54] METHOD FOR PRODUCING ORIENTATION LAYERS FOR LIQUID CRYSTAL DISPLAYS AND LIQUID CRYSTAL DISPLAYS HAVING ORIENTATION LAYERS

[75] Inventors: Hellmut Ahne, Röttenbach; Hans Krüger, Munich; Roland Rubner, Röttenbach, all of Fed. Rep. of Germany

[73] Assignee: Siemens Aktiengesellschaft, Berlin and Munich, Fed. Rep. of Germany

[21] Appl. No.: 818,051

[22] Filed: Jan. 10, 1986

Related U.S. Application Data

[63] Continuation of Ser. No. 613,769, May 24, 1984, abandoned, which is a continuation of Ser. No. 350,609, Feb. 22, 1982, abandoned.

[30] Foreign Application Priority Data

Feb. 27, 1981 [DE] Fed. Rep. of Germany ....... 3107519

[51] Int. Cl.[4] .................... G02F 1/133; C08F 283/04
[52] U.S. Cl. ...................................... 350/341; 525/426
[58] Field of Search .................. 350/339 R, 340, 341; 525/426; 428/212; 430/270, 280, 285, 296

[56] References Cited

U.S. PATENT DOCUMENTS

| 3,787,110 | 6/1974 | Berreman et al. | 350/341 |
| 4,385,165 | 5/1983 | Ahne et al. | 525/426 |
| 4,397,999 | 8/1983 | Ahne et al. | 525/426 |
| 4,398,009 | 8/1983 | Ahne et al. | 525/426 |

*Primary Examiner*—John K. Corbin
*Assistant Examiner*—David Lewis
*Attorney, Agent, or Firm*—Kenyon & Kenyon

[57] ABSTRACT

The invention relates to a method for the production of orientation layers for liquid crystal displays by applying a solution of an organic prepolymer to a transparent substrate and subsequently annealing the layer and subjecting it to an orientation treatment, wherein prepolymers of polyoxazoles, polythiazoles, polyimidazoles, polyoxazinones, polyoxazine diones or polyquinoxalines are used as the organic prepolymer. The method is particularly suitable for the preparation of orientation layers for glass-solder liquid crystal displays.

10 Claims, 1 Drawing Figure

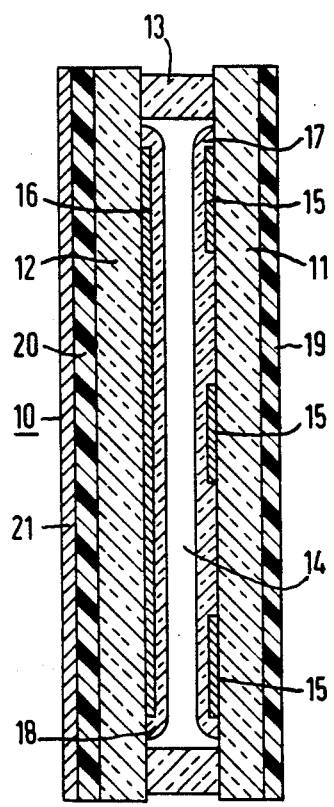

METHOD FOR PRODUCING ORIENTATION LAYERS FOR LIQUID CRYSTAL DISPLAYS AND LIQUID CRYSTAL DISPLAYS HAVING ORIENTATION LAYERS

This application is a continuation of application Ser. No. 613,769, filed May 24, 1984 which in turn is a continuation of Ser. No. 350,609 filed Feb. 22, 1982, both now abandoned.

BACKGROUND OF THE INVENTION

The present invention relates to a method for producing orientation layers for liquid crystal displays wherein a solution of an organic prepolymer is applied to a transparent substrate and subsequently is annealed and subjected to an orientation treatment. The invention also relates to liquid crystal displays having an orientation layer produced according to this method.

In liquid crystal displays (LCDs), uniform orientation of the liquid crystals is necessary. For this reason, so-called "orientation layers" are applied to the electrodes. The orientation layers can be produced, for example, by oblique vapor deposition with $SiO_x$. This is, however, an elaborate and relatively expensive method, and for this reason the use of orientation layers of organic materials also has been attempted.

In addition, a good seal is required in liquid crystal displays in order to ensure operational reliability of the display. In high-quality displays, sealing with glass solder, a low-melting glass, is used instead of cementing. In such glass solder-liquid crystal displays, therefore, the orientation layers must be able to withstand temperatures up to 400° C. and higher without change of their morphological structure.

Organic orientation layers for liquid crystal indicators or displays consist, for example, of polyvinyl alcohol. Polyvinyl alcohol layers, however, have only very limited thermal dimensional stability and chemical resistance. For higher thermal requirements, therefore, orientation layers of polyimide are used. The orientation layers of polyimide are produced from a polyimide prepolymer. Thus, a polyamidocarboxylic acid is dissolved in a solvent and applied to the electrode layer or to the electrode base plate. After the application, the film coating is heated to higher temperatures, i.e., annealed, whereby the polyimide is formed from the polyamidocarboxylic acid. This is then followed by the orientation treatment of the polyimide resin film (see in this connection U.S. Pat. No. 4,068,923).

Because of its intrinsic coloring, however, polyimide can only be used as an orientation layer in a very small layer thicknesses. In addition, polyimide layers do not provide quality improvement functions for the glass substrate, because the polyimide itself lacks alkali resistance. Relatively expensive glass substrates with an additional $SiO_2$ layer are, therefore, necessary. Furthermore, polyimide orientation layers are not very well suited for high-quality liquid crystal displays sealed or fused with glass solder because their thermal dimensional stability is too low.

SUMMARY OF THE INVENTION

It is an object of the present invention to develop a method of the type mentioned at the outset in such a manner that the production of organic orientation layers for liquid crystal displays can be facilitated which have only little intrinsic coloring even in layer thicknesses of greater than or equal to 0.1 μm, are sufficiently transparent as well as resistant to alkali media, and suffer no change of their morphological structure even at temperatures above 420° C.

According to the present invention, these and other objects are achieved by producing orientation layers using prepolymers of polyoxazoles, polythiazoles, polyimidazoles, polyoxazinones, polyoxazine diones or polyquinoxalines.

Prepolymers of the type mentioned exhibit high thermal stability (up to 520° C.) and resistance to alkali. Besides high transparency of the films and little intrinsic coloring which changes only insignificantly even under high thermal stresses, the orientation layers produced according to the method of the present invention are distinguished by high thermal dimensional stability, which surprisingly does not lead to changes, even of very fine morphological structures, even at temperatures at or above 420° C. According to the method of the present invention, orientation layers in the form of so-called rubbed layers can therefore be produced. Thus, the expensive oblique vapor deposition can be dispensed with even for the production of high-quality glass solder-liquid crystal displays, and the more cost-effective rubbing technique can be used. The high transparency and minimal intrinsic coloring of the orientation layers produced in accordance with the method of the present invention additionally permits use of greater layer thicknesses so that these layers can take on an additional protection or quality improvement function, particularly because of the resistance of the layers to alkali. This means that if such orientation layers are used, less expensive glass substrates can be used as base materials, which leads to a substantial cost reduction in the production of liquid crystal displays.

The prepolymers used in the method according to the present invention have in general the following structure:

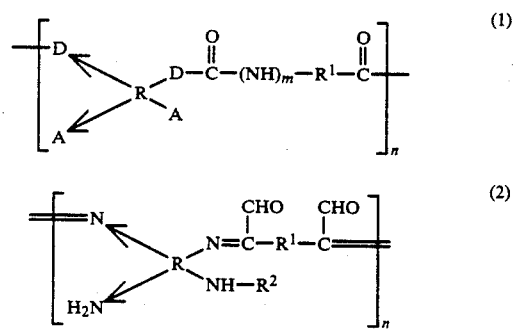

By the arrows contained in each formula, it is intended to express the fact that the two substituents at R can interchange their position. This is important for the reason that R is a cyclic radical, as will be explained in the following.

In the formulae (1) and (2), n is always an integral number from 2 to about 100; m, as is explained hereinafter, is 0 or 1.

For the radicals R, $R^1$, $R^2$, A and D the following applies:

R is an optionally halogenated, at least partially aromatic and/or heterocyclic tetravalent, i.e., tetrafunctional, radical, in which two respective valences are arranged in mutually adjacent position; if the radical R has several aromatic and/or heterocyclic structural elements, then the valences pairs are always located at end-position structural elements of this kind;

$R^1$ is an optionally halogenated divalent, i.e. difunctional, radical of aliphatic and/or cycloaliphatic structure, optionally having heteroatoms, and/or of aromatic and/or heterocyclic structure;

$R^2$ is hydrogen or an optionally substituted alkyl radical;

A is —COOR$^2$, —OR$^2$, —SR$^2$ or

where $R^3$ is hydrogen or an alkyl or an alkylesteralkyl radical; and

D is —O— or —NH—.

For A and D the following combinations are permitted, with the class of polymer being formed from the particular prepolymer being shown in parentheses:

For D=—NH— and m=0, A=—OR$^2$(polyoxazole), —SR$^2$(polythiazole), —NR$^2$R$^3$(polyimidazole) or —COOR$^2$(polyoxazinone).

For D=—O— and m=1, A=—COOR$^2$(polyoxanine dione).

Overall, the prepolymers belonging to the polymers mentioned above are represented by formula (1); formula (2) represents the polyquinoxaline prepolymers.

The radicals R, $R^1$ and $R^2$ have, in particular, the following meaning:

-continued

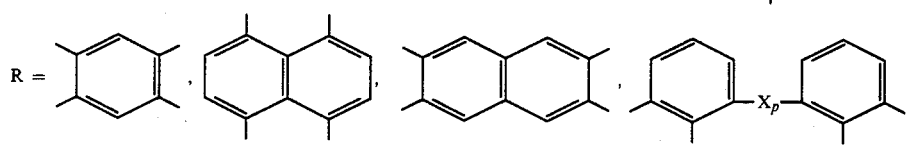

For the further radicals, the following applies:

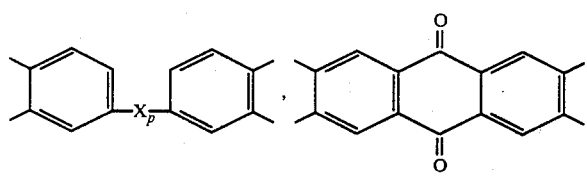

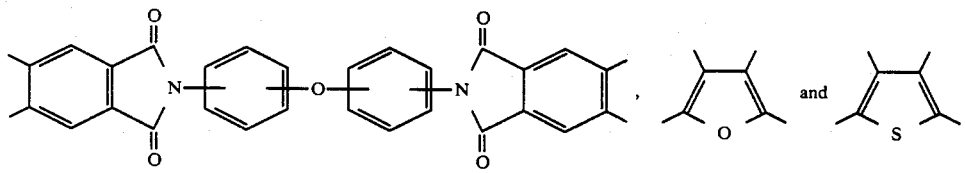

where p=0 or 1 and X stands for one of the following radicals:

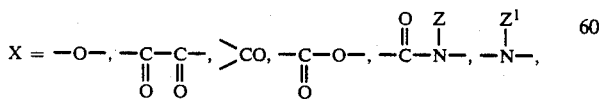

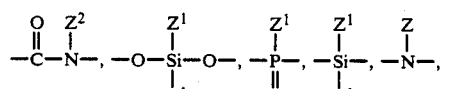

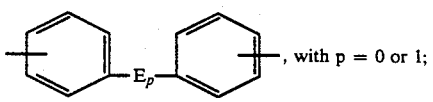

Z=H or alkyl with 1 to 6 carbon atoms;
$Z^1$=alkyl with 1 to 10 carbon atoms or aryl;
$Z^2$=aryl or heteroaryl; and E = 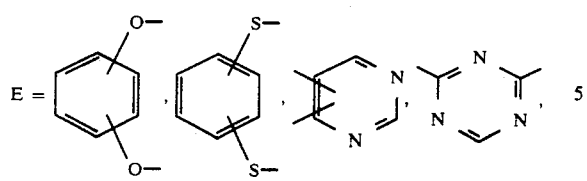

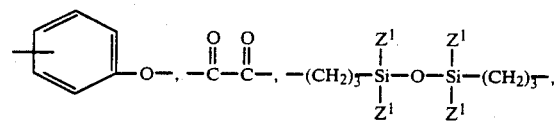

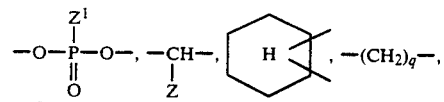

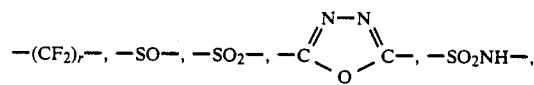

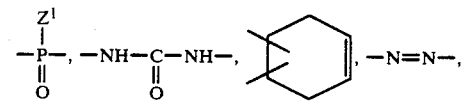

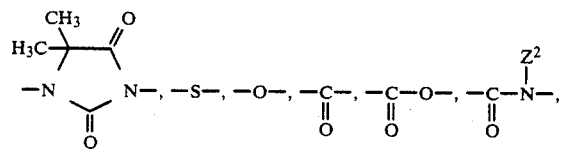

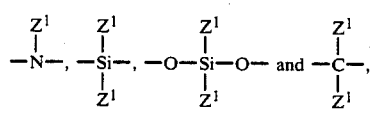

where q=2 to 14 and r=2 to 18, and Z, $Z^1$ and $Z^2$ are defined as above.

$R^1$ = 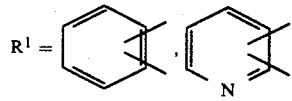

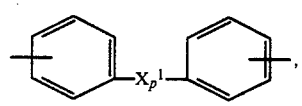

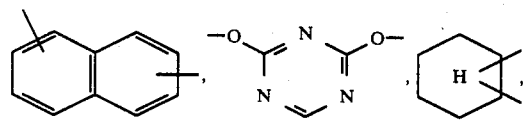

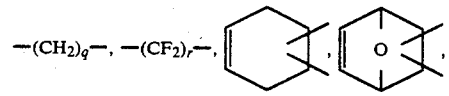

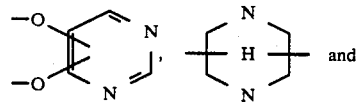

-continued

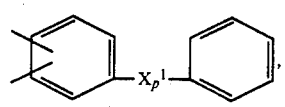

where p=0 or 1, q=2 to 14 and r=2 to 18; in the case of the radical $R^1$, the hydrogen atoms also may be substituted by Cl or Br.

For $X^1$, the following applies:

$X^1$ = 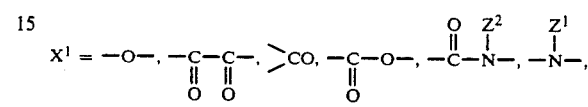

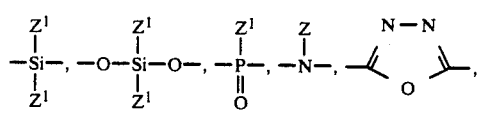

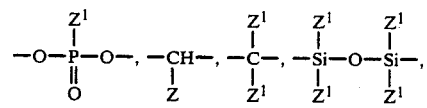

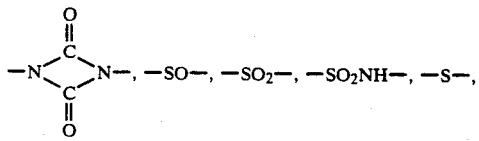

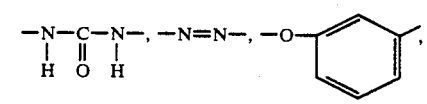

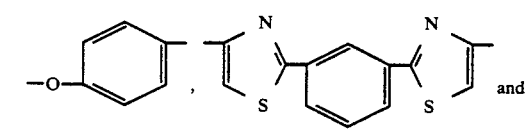

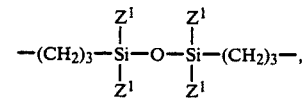

where Z, $Z^1$ and $Z^2$ are defined as above.

$R^2$ = $-H$, $-(CH_2)_s-X^2$, 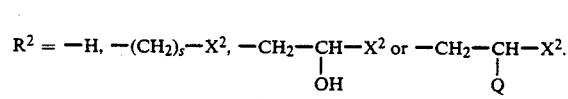

where $X^2$=alkyl, alkoxyalkyl, alkaminoalkyl, alkylesteralkyl, aryl, heteroaryl or cycloalkyl, as well as

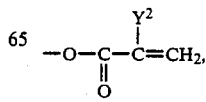

-continued

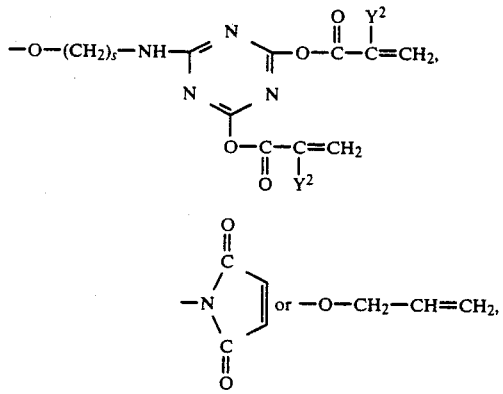

with s=2 to 16, and $Y^2 = -H$, $-CH_3$, $-Cl$, $-Br$, $-C\equiv N$; and

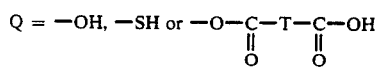

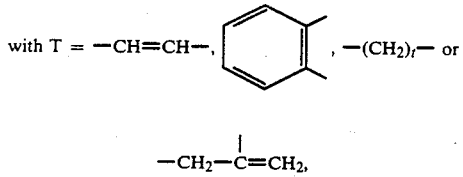

where t=2 to 20.

Compounds of the type mentioned above, and specifically polyimidazole, polyoxazine dione and polyoxazole prepolymers, are described, for example, in German Offenlegungsschriften Nos. 29 33 819, 29 33 826 and 29 33 828.

The polyoxazole prepolymers are addition products of olefinically unsaturated monoepoxides and hydroxyl-group containing polycondensation products of aromatic and/or heterocyclic dihydroxydiamino compounds with dicarboxylic acid chlorides or esters. The polyimidazole prepolymers are addition products of olefinically unsaturated monoepoxides and amino-group containing polycondensation products of aromatic and/or heterocyclic tetraamino compounds with dicarboxylic acid chlorides or esters, and the polyoxazine dione prepolymers are addition products of olefinically unsaturated monoepoxides and carboxyl-group containing poly-addition products of aromatic and/or heterocyclic dihydroxydicarboxylic acids and diisocyanates.

It is advantageous in the method according to the present invention to employ prepolymers which give off a large percentage of volatile products in annealing. A reduction of the layer thickness can be obtained in this manner and specifically up to 40% and more, such that very thin layers can be produced. Although layer thicknesses of less than 0.02 μm are obtained in this manner, such layers exhibit a homogeneous character.

To reduce the layer thickness, there can further be added to the prepolymer solution monomers, oligomers and/or polymers, which evaporate at least in part at temperatures above 250° C., i.e., in the annealing process. Suitable additives are, for example, diazoquinones (o-quinone-and o-naphthoquinone diazides), oligomeric esters and ethers with aliphatic or cycloaliphatic structural elements and polymer compounds such as polymethylmethacrylate and polyolefin sulfones.

Liquid crystal displays according to the present invention are characterized by the feature that they comprise orientation layers of polyoxazole, polythiazole, polyimidazole, polyoxazinone, polyoxazine dione or polyquinoxaline. The orientation layers are made of polymer precursor stages (so-called "prepolymers"). The polymer layers, which are oriented in a given direction, are deposited on the electrodes or electrode layers and can in part also cover the electrode base plates (carrier plates).

DETAILED DESCRIPTION OF THE INVENTION

The invention is explained in greater detail with reference to the following examples and the FIGURE, in which one embodiment of a liquid crystal display according to the present invention is shown.

EXAMPLE 1

Orientation Layers of Polybenzoxazole

For the preparation of a polybenzoxazole-prepolymer, 6.1 parts by weight isophthalic acid dichloride in 20 parts by volume cyclohexanone are added dropwise within about 30 minutes at a temperature of −5° to −20° C., with vigorous stirring, to a solution of 6.5 parts by weight 3,3'-dihydroxybenzidine in 50 parts by volume dimethylacetamide and 9 parts by volume pyridine. After further stirring for 3 hours at room temperature, the viscous reaction solution is left to stand overnight. The solution then is added dropwise to 1000 parts by volume of water. The resin precipitated is then separated, washed with water and methanol and dried in a vacuum at about 60° C.

With a 10-% solution of the so prepared prepolymer in N-methylpyrrolidone, which solution also contains as an adhesion agent 1%, referred to the solid resin, of a vinylalkoxysilane, such as vinyl-tris (β-methoxyethoxy)-silane, the carrier plates provided with the electrodes are coated by the so-called roller-coating method. Border zones to which the cemented frame or the glass solder seal is applied later can be kept free by structured rollers or templates. The preolymer solution also can be applied to the electrodes by brushing-on, immersion or spraying. After the coating, the film coating is dried at about 100° C. and subsequently annealed at temperatures of about 270° C. and 400° C. (one-half hour at each temperature), whereby homogeneous layers with a layer thickness of 0.04 μm are obtained. By rubbing with a brush, the grooves necessary for the orientation of the liquid crystals are then generated on the surface of the polybenzoxazole layer. The orientation treatment, however, also can be performed with a cloth, but the rubbing must always be done in a constant direction using this method.

The orientation layers prepared in the above-mentioned manner bring about a good orientation, i.e. uniform alignment, of the liquid crystals in displays made by the cementing technique. The good orientation properties, however, are also retained in displays made by the glass-solder technique, where two carrier plates are joined together at the edge at temperatures of about 460° C. by means of glass soldering. As control tests have shown, the orientation properties in polyimide orientation layers are lost after they are heated to 460° C.

The orientation layers provided in the liquid crystal displays according to the present invention are transparent not only with a layer thickness of 0.04 μm and show little intrinsic coloration, but, for example, layers 0.14 μm thick also show no discoloration.

EXAMPLE 2

Orientation Layers of Polybenzoxazine Dione

For the preparation of a polybenzoxazine dione prepolymer, 25 parts by weight p,p'-diphenylmethane diisocyanate (0.1 mol) dissolved in 50 parts by volume N-vinylpyrrolidone are slowly added dropwise to a solution of 28.8 parts by weight methylenedisalicyclic acid (0.1 mol) and 0.1 parts by weight 1,4-diazabicyclo[2,2,2]octane as a catalyst in 100 parts by volume N-methylpyrrolidone at room temperature while stirring. After a reaction time of 20 hours at room temperature, 75 parts by volume glycidylacrylate and 0.1 parts by weight hydroquinone are added to this solution while stirring. After a further reaction time of 20 hours at a temperature of 50° to 60° C. and 48 hours at room temperature, the resin is precipitated with 2000 parts by volume toluene and dried in a vacuum.

The carrier plates provided with the electrodes are coated by the roller-coating method with a 12-% solution of the so-prepared prepolymer in dimethylacetamide, which solution also contains 1%, referred to the solid resin, of vinyltriethoxysilane as an adhesion agent. The so-obtained film coating is dried to nitrogen for 1 hour at about 80° C. and is subsequently annealed for one hour at about 200° C. and ½ hour at about 400° C. Subsequently, the surfaces of the polybenzoxazine dione layers are oriented by rubbing with a brush in a definite direction and the coated carrier plates then are joined together at a temperature of about 440° C. by means of glass solder. Also after this thermal treatment, the liquid crystals of the displays are well oriented.

EXAMPLE 3

For the preparation of very thin orientation layers one can proceed in such a manner that a solution is used for coating the carrier plates which contains a diazoquinone as well as the prepolymer.

Tests have shown, for example, that if a solution of 10 g of the polybenzoxazole-prepolymer prepared in accordance with Example 1 and of 10 g of the bis-naphthoquinone-(1,2)-diazide-(2)-5-sulfonic acid ester of β,β-bis(4-hydroxyphenyl)propane in 180 ml N-methyl-pyrrolidone is applied by means of the centrifuging technique (4000 rpm) on a glass substrate, there is obtained after two hours of drying at 55° C. in a circulating-air oven (with 25% fresh air admixture), a layer with a thickness of 0.08 μm. After annealing for one hour at about 400° C., a homogeneous layer with a thickness of 0.03 μm is then produced therefrom.

In the FIGURE shown in a schematic side cross section, an embodiment of a display 10 according to the present invention, and specifically a 7-segment liquid crystal display. The display 10 has a front carrier plate 11 and a back carrier plate 12. The two carrier plates are joined together hermetically sealed at their edge zones by means of glass solder, a kind of frame 13 being formed at the same time. In the space between the carrier plates 11 and 12 separated by the frame 13 are contained the liquid crystals 14. On the surfaces of the two carrier plates facing each other, electrodes or electrode layers 15 and 16 in the form of electrically conducting coatings are arranged. The front electrodes 15 as well as the free surface of the carrier plate 11 are coated with an orientation layer 17, and an orientation layer 18 is provided on the back electrode 16. The orientation layers 17 and 18 consist, for example, of polybenzoxazole.

On the sides facing away from each other, the carrier plates 11 and 12 each are provided with a linear polarizer 19 and 20, the rear polarizer being arranged crosswise to the front one. At the rear linear polarizer 20, a reflector 21 is further arranged. The liquid crystal display 10 operates according to the principle of the so-called twisted cell which is described in detail, for example, in German Auslegeschrift No. 21 58 563 or in the corresponding British Pat. No. 1,372,868.

What is claimed is:

1. In a method for producing orientation layers for liquid crystal displays wherein a solution of an organic prepolymer is applied to a transparent substrate and subsequently annealed and subjected to an orientation treatment, the improvement comprising employing as said solution of an organic prepolymer, a solution of a prepolymer of a polyoxazole, a volatile compound and a solvent, and rubbing after annealing without photolyzing or irradiating before annealing as the orientation treatment, to produce a homogeneous orientation layer which will exhibit essentially no change in morphological structure up to a temperature of about 46° C., which shows essentially little intrinsic color when the layer thickness is at least about 0.1 μm, and which, after annealing, is reduced in thickness up to about forty percent compared with its thickness before annealing as a result of volatilization of the volatile compound during annealing, wherein the polyoxazole prepolymer has the formula:

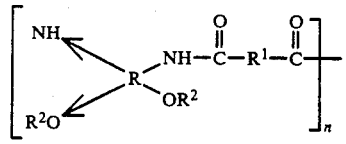

R being an at least partially aromatic or heterocyclic, halogenated or non-halogenated, tetravalent group; $R^1$ being a divalent, halogenated or non-halogenated aliphatic, cycloaliphatic, aromatic, or heterocyclic group; $R^2$ being an alkyl group which is free from an olefin substituent; and n being an integral number from 2 to about 100;

and wherein said volatile compound is a monomer, oligomer, polymer or mixture thereof which evaporates at least in part at a temperature above 250° C.

2. The method according to claim 1 wherein said prepolymer solution gives off a large percentage of volatile products during annealing.

3. The method according to claim 1 wherein a silane is included in the prepolymer solution.

4. In a liquid crystal display wherein liquid crystals are arranged between the surfaces of electrically conductive electrodes or electrode layers and wherein an organic orientation layer is provided on at least the surface of said electrodes and electrode layers, the improvement comprising said organic orientation layer being a homogeneous unphotolyzed, unirradiated, rubbed, annealed polyoxazole prepared from a solution of a prepolymer of a polyoxazole, a volatile compound and a solvent, said layer exhibiting essentially no change in morphological structure up to a temperature of about 460° C., showing essentially little intrinsic color when the layer thickness is at least about 0.1 μm and after annealing, said layer being reduced in thickness up to about forty percent compared with its thickness before annealing as a result of volatilization of the volatile compound during annealing, wherein said prepolymer of the polyoxazole has the formula:

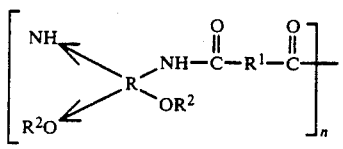

R being an at least partially aromatic or heterocyclic, halogenated or non-halogenated, tetravalent group; $R^1$ being a divalent, halogenated or non-halogenated aliphatic, cycloaliphatic, aromatic, or heterocyclic group; $R^2$ being an alkyl group which is free from an olefin substituent; and n being an integral number from 2 to about 100;

and wherein said volatile compound is a monomer, an oligomer, a polymer, or a mixture thereof which evaporates at least in part at a temperature above 250° C.

5. A method according to claim 1 wherein the layer thickness is less than about 0.15 um.

6. A display according to claim 4 wherein the layer thickness is less than about 0.15 um.

7. A method according to claim 1 wherein said layer has a thickness after annealing which is reduced at least about 40% relative to its thickness before annealing.

8. A method according to claim 7 wherein the layer thickness after annealing is less than about 0.1 um.

9. A display according to claim 4 wherein said layer has a thickness after annealing which is reduced at least about 40% relative to its thickness before annealing.

10. A display according to claim 9 wherein the layer thickness after annealing is less than about 0.1 um.